UNITED STATES PATENT OFFICE.

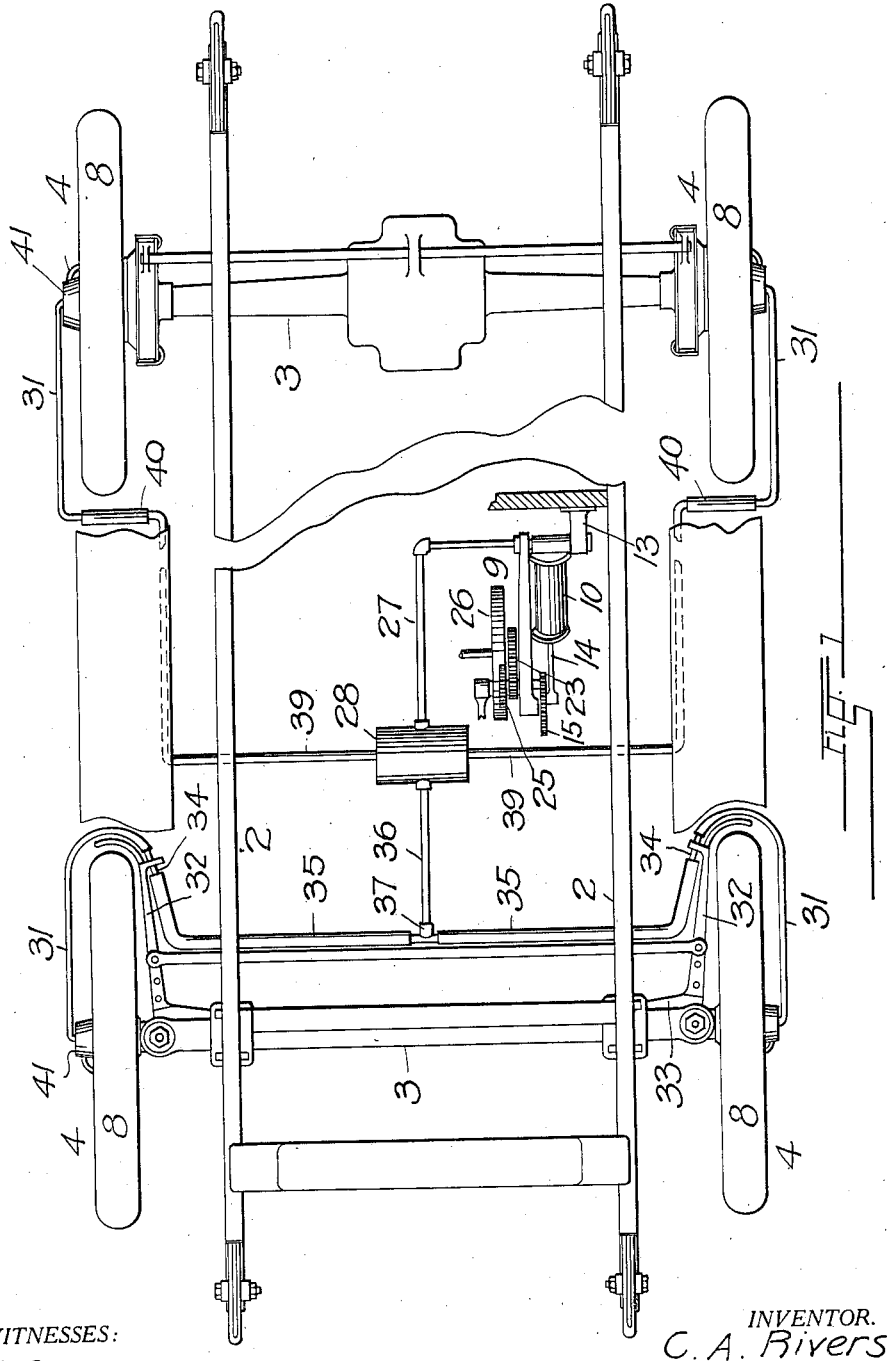

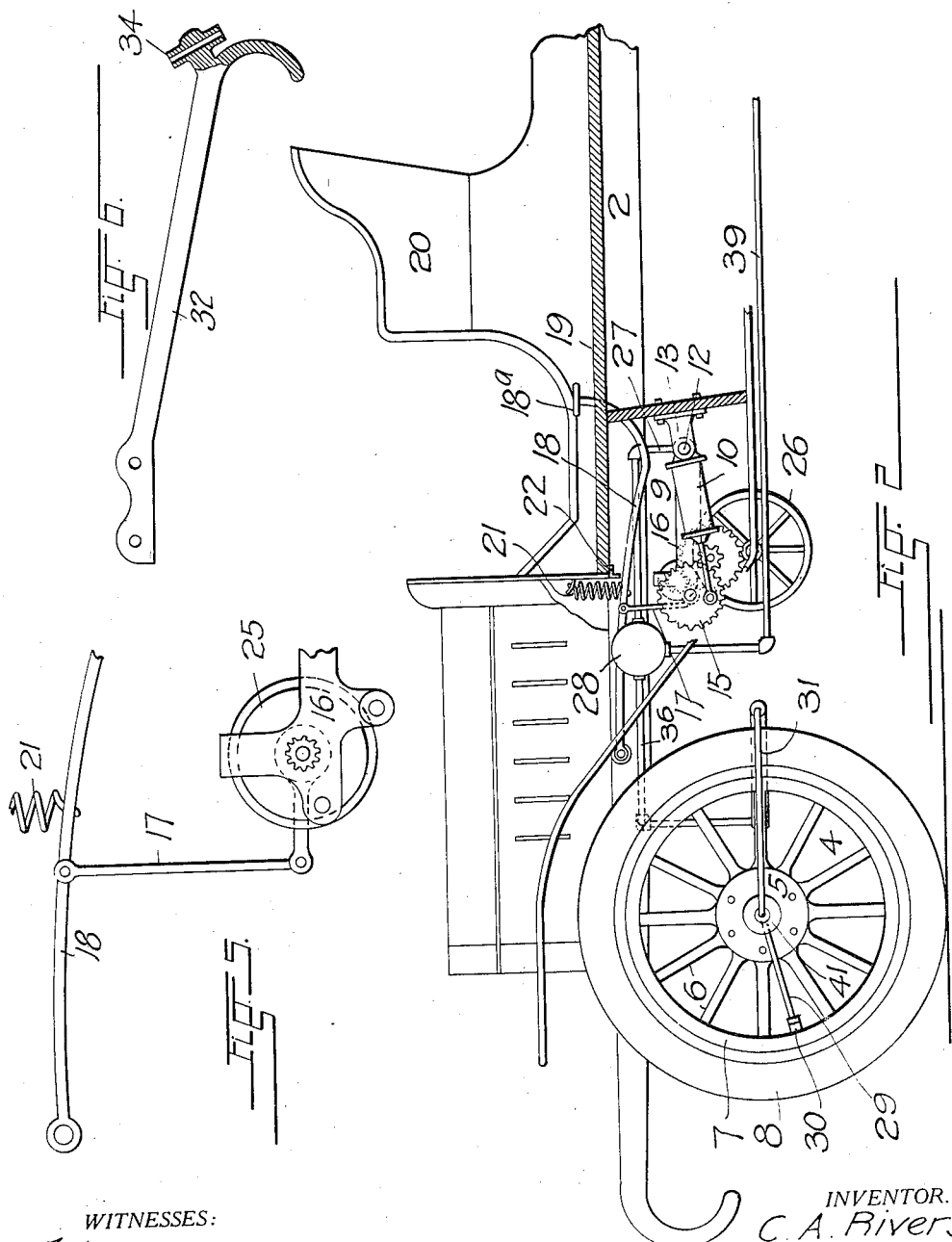

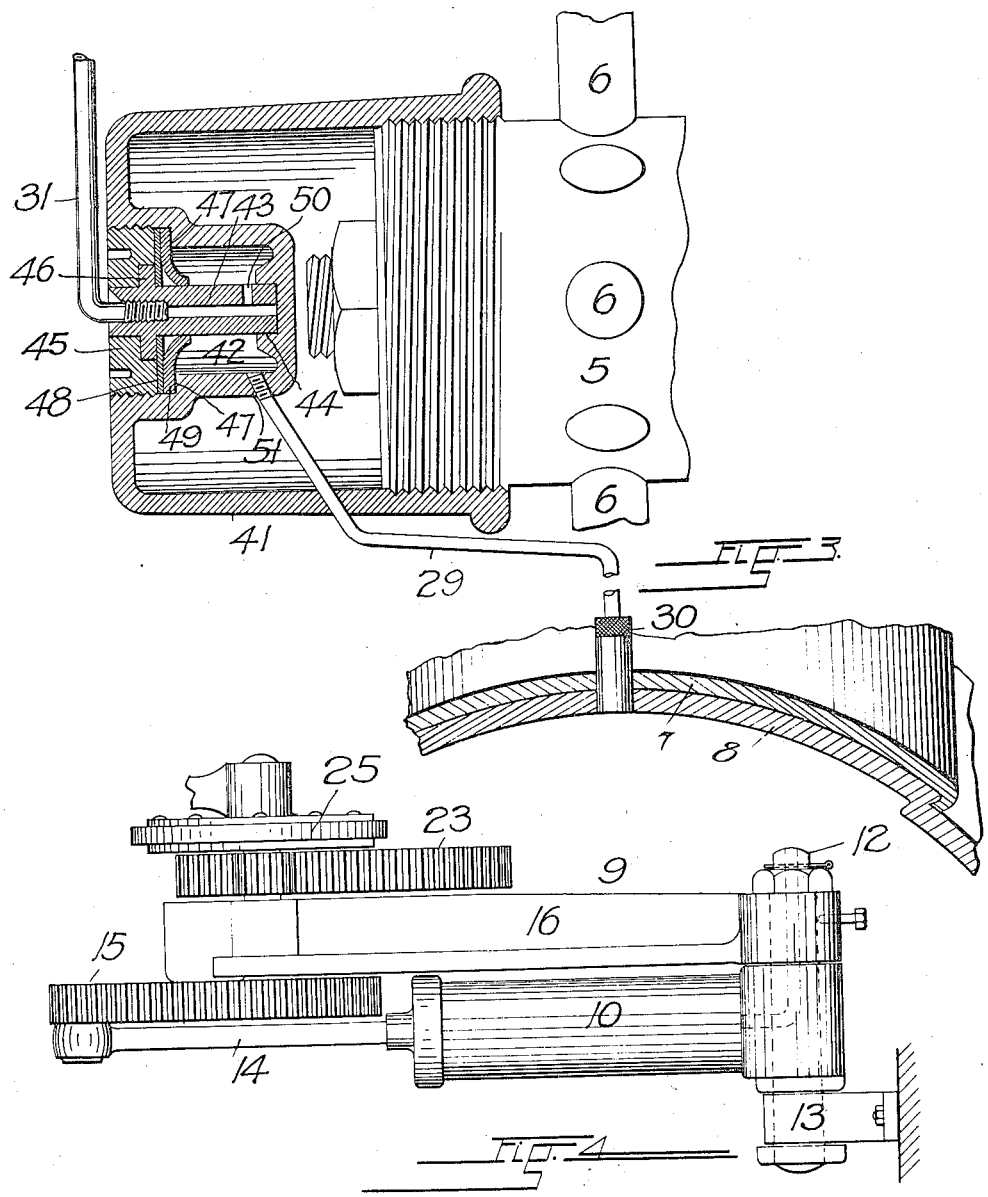

CHARLES A. RIVERS, OF DENVER, COLORADO.

SYSTEM FOR INFLATING PNEUMATIC TIRES.

1,016,896. Specification of Letters Patent. Patented Feb. 6, 1912.

Application filed March 13, 1909. Serial No. 483,259.

*To all whom it may concern:*

Be it known that I, CHARLES A. RIVERS, citizen of the United States of America, residing at Denver, in the county of Denver and State of Colorado, have invented certain new and useful Improvements in Systems for Inflating Pneumatic Tires, of which the following is a specification.

This invention pertains to an apparatus for inflating pneumatic tires and its object is to provide an organization of coöperative devices whereby the pneumatic tires of an automobile or other vehicle may be simultaneously or separately inflated through the instrumentality of an air supply such as a pump adapted to be actuated by the motor or engine by which the vehicle is propelled, either while the latter is at rest or in motion. I attain this object by the mechanism illustrated in the accompanying drawings in the various views of which like parts are similarly designated and in which—

Figure 1, represents a plan view of an automobile truck, with the parts included in the inflating system, in operative position. Fig. 2, a partially sectional view of the front portion of the vehicle shown in Fig. 1. Fig. 3, an enlarged elevation of one of the wheel hubs, with the therewith connected member of the system, in operative position. Fig. 4, a plan view of the pump employed in the inflating system. Fig. 5, an enlarged fragmentary view of the operating lever, and the therewith associated parts of the pump-mechanism and, Fig. 6, an enlarged view partly in section of the arm whereby the conduits included in my system are supported upon the pivot steering levers at the front axle of the truck.

Referring to the drawings by numerical reference characters, let the numeral 2 designate the automobile frame, 3 the therewith connected axles and 4 the wheels which include a hub 5, spokes 6, rims 7 and pneumatic tires 8. Mounted upon a suitable part of the frame 2, is a force pump 9 which may be of any suitable construction and which in the operation of the apparatus, is driven from the engine or motor by which the vehicle is propelled.

The pump illustrated in the drawings which, by reason of its simplicity, is preferable over others, is composed of an oscillatory cylinder 10, mounted upon an axle 12 of a support 13 which is fixedly secured upon the frame 2.

The piston rod 14, connects with a peripherally toothed crank wheel 15, mounted upon the extremity of an arm 16 whose opposite end is pivotally connected with the axle 12 and which is suspended by means of a link 17, from a foot-lever 18, through the instrumentality of which the pump is actuated.

The lever 18 is pivotally supported at one of its ends, upon the frame 2 while its opposite end is formed with a treadle 18ª and projects through the floor 19 of the vehicle in front of the driver's seat 20.

A coiled spring 21 serves to resiliently maintain the lever in its normal position while a stop 22 is arranged to arrest excessive upward motion thereof.

The crank wheel 15 is by means of a gear train 23, operatively associated with a friction wheel 25, which, as well as the members of the gear train, is revolubly mounted upon the free extremity of the arm 16 and which is disposed in superposed, normally spaced relation to a drive wheel 26, preferably one of the fly-wheels of the motor by which the vehicle is propelled, and which, for obvious reasons, has not been shown in the drawings.

By depressing the treadle-end of the lever 18, the operator of the vehicle, may thus, through instrumentality of the link 17, cause the arm 16 to move about its pivotal axis and, in consequence, bring the wheel 25 in frictional contact with the fly-wheel 26 with the result that when the motor of which the latter forms part, is in action, a rotative movement is imparted to the wheel 25, which movement is, by means of the gear trains 23 and the crank wheel 15, transposed into a reciprocating motion of the piston connected with the rod 14.

The interior of the cylinder 10 communicates with a bore in the axle 12, and a tubular conduit 27 connects this bore with a reservoir 28 which is mounted upon the vehicle frame and which serves to store the air compressed by the pump and to supply the same to the tires of the wheels upon which the vehicle is supported. Each of the wheels 4, is, to this purpose, provided with a pipe 29 one end of which is screwed upon the tire-nipple 30, while its opposite extremity projects into the wheel hub to communicate, by means hereinafter to be described, with a conduit 31 rigidly secured upon the vehicle frame.

The outer ends of the conduits 31, associated with the front wheels of the vehicle, are preferably supported upon an arm 32 one end of which is secured upon the pivot lever 33 of the steering mechanism and whose opposite end carries a union 34 which connects said conduit with a flexible tube 35. The extremities of the tube 35 which extend from the two front wheels toward the center of the car, are connected by means of a pipe 36 and a tee 37, with the reservoir 28.

The communication between the conduits 31 associated with the rear wheels of the vehicle, and the reservoir 28, is established by the use of pipes 39, one end of which connects with said reservoir and whose opposite ends are connected with said conduits by interposed tubes 40, composed of flexible material.

It will be observed that by reason of the flexible connections between the pipes leading from the reservoir and those associated with the vehicle wheels, the trucks of which the latter form part, are free to move about their vertical axes, in changing the direction in which the vehicle is propelled.

The connection between the fixed conduits 31 and the pipes 28 leading from the tire-nipples, is accomplished through the instrumentality of the following appliances.

A cylindrical cap 41 screwed upon the outer end of the wheel hub 5, is formed with an axially disposed cylindrical chamber 42, which opens in the outer face of said cap.

The extremity of the pipe 31 being bent at right angles to its body portion, carries an axially bored, cylindrical head 43, which projecting axially through the chamber 42, is supported at one end in a cavity 44 formed in the inner wall of said chamber and at its opposite end in a central opening of a nut 45, which closes the mouth of the chamber. The head 43 has a circumferential flange 46 which occupies a corresponding recess in the inner face of the nut 45, and the internally threaded outer portion of the chamber 42, into which the latter is secured, exceeds in diameter, the body portion of said chamber so as to form a circular shoulder 47.

Two washers 48 and 49 are placed between this shoulder and the inner face of the nut for the purpose of rendering the joint between the latter and the relatively stationary head 43, impervious to air and moisture. The washer 48, which is in direct engagement with the face of the nut and that of the flange 46, is preferably composed of brass or similar material, while the second washer 49, placed between the first washer and the shoulder 47, is made of heavy leather, the inner portion of which projects inwardly to frictionally engage the circumferential surface of the head.

A transverse passage 50 between the bore and the circumferential surface of the head 43, connects the former with the interior of the chamber 42, whose circumferential wall is apertured at 51 for the reception of the extremity of the pipe 29 whose opposite end connects with the tire-nipple 30, as hereinbefore described.

Having thus described the mechanical construction and arrangement of the elements and connections comprised in my system for inflating tires, its operation and the advantages derived therefrom will be readily understood.

If, while the vehicle is in motion one or more of the tires becomes deflated by a puncture or other defect, the operator depresses the treadle-end of the foot lever 18 and thereby carries the friction wheel 25, in engagement with the circumferential surface of the fly-wheel 26 of the vehicle motor. The rotary movement thus imparted to the former is tranformed into a reciprocating motion of the pump piston, by the means hereinbefore described, and the air displaced by the action of the piston, is forced through the bore in the axle 12 and the therewith communicating pipe 27, into the reservoir 28, from where it is supplied through the conduits 36, 39, 35 and 40 to the stationary conduits 31, by which the air is discharged into the bore of the respective heads 43 and through the passages 50, into the interior of the chamber 42 in the cap 41, whence it flows through the pipe 29 and the valve controlled nipple 30 into the interior of the tire 8.

In case the defect in the tire wall is such as to cause a constant leakage, the pump may be kept continually in motion until a place is reached where the tire can be repaired; and, if it is desired to inflate a tire while the vehicle is at rest, the pump is operated by the vehicle motor while disconnected from the mechanism whereby its movement is transmitted to the axle of the vehicle.

It will furthermore be understood that by supplying the reservoir 28 with compressed air, before the vehicle is started, and controlling its outlets by suitable valves, the pump 9 may be omitted from the apparatus and that, in case a connection between the pump and the motor is impractical, the former may be operated either by coöperative association with any other moving part of the vehicle or by the application of any suitable actuating contrivance.

Having thus described my invention what I claim and desire to secure by Letters Patent is:—

1. In an apparatus for inflating pneumatic tires, the combination with a wheel and its pneumatic tire, of a cap fixed upon the wheel hub and including an interior, normally closed chamber in communication with said tire and having an axial opening in its outer end, an interior recess surrounding the same and a cavity corresponding with said opening in its opposite end, a longitudinally bored head fitted in said opening and in said cavity and having a passage connecting the bore with the interior of the chamber and an integral collar occupying said recess, a washer connected with said chamber covering the joint between the collar and the recess, a second washer similarly connected in frictional engagement with the circumferential surface of the head and a conduit extending outside of said cap, fixedly connected with the head in communication with its bore.

2. In an apparatus for inflating pneumatic tires, in combination with a wheel and its pneumatic tire, of a cap fixed upon the wheel-hub and having a chamber communicating with its exterior surface by an axial opening, a head fitted in said opening and having an axial bore in communication with said chamber, a flexible washer fixed at its marginal portion, and in frictional engagement with the circumferential surface of the head, a fixed conduit in communication with the bore of said head, and a connection between the said chamber and the tire.

3. In an apparatus for inflating pneumatic tires, the combination with a wheel and its pneumatic tire, of a cap adapted to be secured upon the wheel-hub and having an axial chamber projecting inwardly from its outer surface, a nut screwed into the outer portion of said chamber, and having an axial opening, a head fitted in said opening and having a bore in communication with the interior of the chamber, a washer clamped between said nut and a shoulder on the wall of the chamber, in engagement with said head, whereby the connection of the latter with the nut is rendered impervious, a fixed conduit in communication with the bore in said head, and a connection between the chamber and the wheel-tire.

In testimony whereof I have affixed my signature in presence of two witnesses.

CHARLES A. RIVERS.

Witnesses:
 M. L. GEARY,
 G. J. ROLLANDET.